United States Patent
Lansinger et al.

(10) Patent No.: US 8,925,620 B2
(45) Date of Patent: Jan. 6, 2015

(54) WINDSHIELD WASHER FLUID HEATER

(75) Inventors: Jere Lansinger, Camano Island, WA (US); Brian Tait, Goodrich, MI (US)

(73) Assignee: TSM Corporation, Auburn Hills, MI (US)

(*) Notice: Subject to any disclaimer, the term of this patent is extended or adjusted under 35 U.S.C. 154(b) by 549 days.

(21) Appl. No.: 13/337,400

(22) Filed: Dec. 27, 2011

(65) Prior Publication Data

US 2012/0125563 A1 May 24, 2012

Related U.S. Application Data

(63) Continuation-in-part of application No. 12/541,207, filed on Aug. 14, 2009, now Pat. No. 8,550,147.

(60) Provisional application No. 61/089,577, filed on Aug. 18, 2008.

(51) Int. Cl.
*B60S 1/46* (2006.01)
*B60H 1/00* (2006.01)
*B60S 1/48* (2006.01)
*F01P 3/12* (2006.01)
*B60S 1/38* (2006.01)

(52) U.S. Cl.
CPC ............. *B60H 1/00342* (2013.01); *B60S 1/487* (2013.01); *F01P 3/12* (2013.01); *B60S 2001/3898* (2013.01)
USPC .................. 165/41; 165/47; 165/51; 165/141; 165/154; 165/155; 165/179; 239/128; 239/129; 239/130; 239/131

(58) Field of Classification Search
USPC ............... 165/41, 47, 51, 141, 154, 155, 156, 165/179; 239/128, 129, 130, 131
See application file for complete search history.

(56) References Cited

U.S. PATENT DOCUMENTS 1,153,095 A 9/1915 Martin
1,228,482 A 6/1917 Schonger
(Continued)

FOREIGN PATENT DOCUMENTS

DE 197803 C 4/1908
DE 2011695 A1 9/1971
(Continued)

OTHER PUBLICATIONS

Supplementary European Search Report dated Mar. 20, 2014 relating to European Application No. 09 80 8698.

*Primary Examiner* — John Ford
(74) *Attorney, Agent, or Firm* — Gifford, Krass, Sprinkle, Anderson & Citkowski, P.C.

(57) ABSTRACT

A windshield washer fluid heater for an automotive vehicle has an elongated housing with two open ends and in which the housing defines a housing chamber. A tubular subhousing divides the housing chamber into an outer housing chamber and an inner housing chamber. A core is disposed in the inner housing chamber and this core forms an annular chamber between the core and the subhousing. A pair of end caps is attached to the ends of the housing and these end caps sealingly engage the housing and the subchamber to fluidly separate the outer housing chamber from the annular chamber. The housing includes a washer fluid passageway which fluidly connects a washer fluid port on the end cap with the annular chamber as well as a coolant fluid passageway which fluidly connects a coolant port on each end cap with the housing chamber.

15 Claims, 4 Drawing Sheets

(56) References Cited

U.S. PATENT DOCUMENTS

| | | | |
|---|---|---|---|
| 1,410,487 A | 3/1922 | McCarty | |
| 1,465,292 A | 8/1923 | Wessig | |
| 1,490,168 A | 4/1924 | Ford | |
| 1,556,030 A | 10/1925 | Redshaw | |
| 1,650,922 A | 11/1927 | Worthington | |
| 1,733,408 A | 10/1929 | Herber | |
| 1,835,833 A | 12/1931 | Williams | |
| 1,917,141 A | 7/1933 | Middleton | |
| 1,933,220 A | 10/1933 | Petree | |
| 1,967,837 A * | 7/1934 | Naab | 165/155 |
| 2,002,426 A | 5/1935 | Allyne | |
| 2,032,998 A | 3/1936 | Mickadelt | |
| 2,056,776 A | 10/1936 | Evans at al. | |
| 2,125,154 A | 7/1938 | Dillon | |
| 2,258,922 A | 10/1941 | Albee | |
| 2,260,904 A | 10/1941 | Horton | |
| 2,367,426 A | 1/1945 | Patterson | |
| 2,576,198 A | 11/1951 | Stuart | |
| 2,662,154 A | 12/1953 | Cochran | |
| 2,738,408 A | 3/1956 | Cheviron | |
| 2,839,773 A | 6/1958 | McMillen | |
| 2,847,193 A | 8/1958 | Carter | |
| 2,894,730 A | 7/1959 | Agule | |
| 2,900,168 A | 8/1959 | Nyborg | |
| 2,947,020 A | 8/1960 | Wiliert | |
| 2,968,071 A | 1/1961 | Di Perna | |
| 3,135,004 A | 6/1964 | Naigraw | |
| 3,243,119 A | 3/1966 | Merkle | |
| 3,292,866 A | 12/1966 | Benner | |
| 3,319,891 A | 5/1967 | Campbell | |
| 3,321,792 A | 5/1967 | Senkewich | |
| 3,366,336 A | 1/1968 | Neuschwanger et al. | |
| 3,371,368 A | 3/1968 | Walker | |
| 3,408,678 A | 11/1968 | Linker | |
| 3,416,428 A | 12/1968 | Heller | |
| 3,427,675 A | 2/1969 | Tibbet | |
| 3,447,186 A | 6/1969 | Senkewich | |
| 3,473,348 A | 10/1969 | Bottum | |
| 3,479,689 A | 11/1969 | Kurzke et al. | |
| 3,489,884 A | 1/1970 | Waseleski, Jr. | |
| 3,493,041 A | 2/1970 | Hourwitz et al. | |
| 3,560,706 A | 2/1971 | Fonseca | |
| 3,568,766 A | 3/1971 | Thomas | |
| 3,574,881 A | 4/1971 | Temple | |
| 3,591,887 A | 7/1971 | Keddie | |
| 3,632,042 A | 1/1972 | Goulish et al. | |
| 3,688,081 A | 8/1972 | Speich | |
| 3,738,252 A | 6/1973 | Cardinale | |
| 3,756,510 A | 9/1973 | Nitterl et al. | |
| 3,757,088 A | 9/1973 | Osborn | |
| 3,835,294 A | 9/1974 | Krohn et al. | |
| 3,868,492 A | 2/1975 | Taylor | |
| 3,887,004 A | 6/1975 | Beck | |
| 3,888,412 A | 6/1975 | Lindo | |
| 3,935,425 A | 1/1976 | Weissberger et al. | |
| 4,037,286 A | 7/1977 | Medearis et al. | |
| 4,059,882 A | 11/1977 | Wunder | |
| 4,085,308 A | 4/1978 | Youngquist | |
| 4,088,269 A | 5/1978 | Schlick | |
| 4,090,668 A | 5/1978 | Kochenour | |
| 4,096,616 A | 6/1978 | Coffinberry | |
| 4,096,910 A | 6/1978 | Coffinberry | |
| 4,109,133 A | 8/1978 | Hanle et al. | |
| 4,127,763 A | 11/1978 | Roselli | |
| 4,132,881 A | 1/1979 | Ciarniello et al. | |
| 4,139,761 A | 2/1979 | Obrowski | |
| 4,145,788 A | 3/1979 | Ferrarelli | |
| 4,177,928 A | 12/1979 | Bergkvist | |
| 4,180,723 A | 12/1979 | Szupillo | |
| 4,212,425 A | 7/1980 | Schlick | |
| 4,236,548 A | 12/1980 | Howard | |
| 4,276,501 A | 6/1981 | Fanz | |
| 4,285,540 A | 8/1981 | Harada et al. | |
| 4,354,548 A | 10/1982 | Carlsson | |
| 4,387,290 A | 6/1983 | Yasuda | |
| 4,508,957 A | 4/1985 | Rocchitelli | |
| 4,575,003 A | 3/1986 | Linker et al. | |
| 4,665,351 A | 5/1987 | Nyberg | |
| 4,700,424 A | 10/1987 | Hagen | |
| 4,763,381 A | 8/1988 | Williams | |
| 4,821,363 A | 4/1989 | Delluc | |
| 4,821,797 A | 4/1989 | Allgauer et al. | |
| 4,832,262 A | 5/1989 | Robertson | |
| 4,834,172 A | 5/1989 | Duran | |
| 4,862,951 A | 9/1989 | Muller et al. | |
| 4,895,203 A | 1/1990 | McLaren | |
| 4,910,380 A | 3/1990 | Reiss et al. | |
| 4,967,437 A | 11/1990 | Morse | |
| 5,010,289 A | 4/1991 | Takada | |
| 5,046,216 A | 9/1991 | Baungarter et al. | |
| 5,065,471 A | 11/1991 | Laplante | |
| 5,099,909 A | 3/1992 | Barigelli et al. | |
| 5,118,040 A | 6/1992 | Abe | |
| 5,221,828 A | 6/1993 | Basheer et al. | |
| 5,264,962 A | 11/1993 | Kho | |
| 5,325,561 A | 7/1994 | Kotlar | |
| 5,327,614 A | 7/1994 | Egner-Walter et al. | |
| 5,354,965 A | 10/1994 | Lee | |
| 5,383,247 A | 1/1995 | Nickel | |
| 5,426,814 A | 6/1995 | Minnick | |
| 5,509,606 A | 4/1996 | Breithaupt et al. | |
| 5,522,453 A | 6/1996 | Green | |
| RE35,890 E | 9/1998 | So | |
| 5,881,428 A | 3/1999 | Simmons | |
| 6,032,324 A | 3/2000 | Lansinger | |
| 8,550,147 B2 * | 10/2013 | Lansinger | 165/41 |
| 2004/0118939 A1 | 6/2004 | Shank et al. | |
| 2007/0295825 A1 | 12/2007 | McNaughton | |

FOREIGN PATENT DOCUMENTS

| | | |
|---|---|---|
| DE | 2914183 | 4/1979 |
| EP | 1512924 A2 | 3/2005 |
| FR | 1194037 A | 11/1959 |
| GB | 2009385 A | 6/1979 |
| GB | 2191390 | 12/1987 |
| JP | 2001-171487 A | 6/2001 |
| KR | 10-1997-0040211 | 7/1997 |
| WO | 2005104690 A2 | 11/2005 |

* cited by examiner

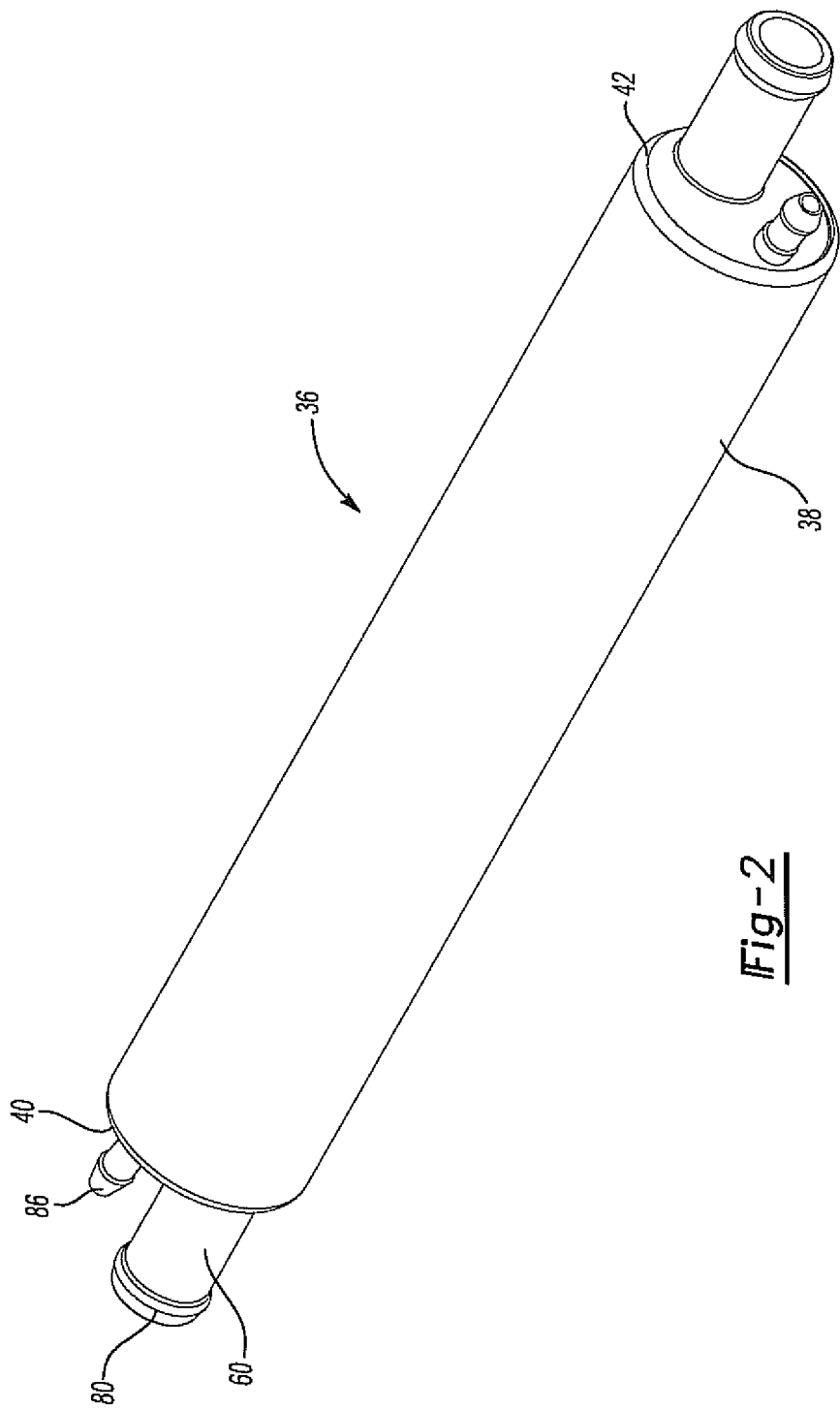

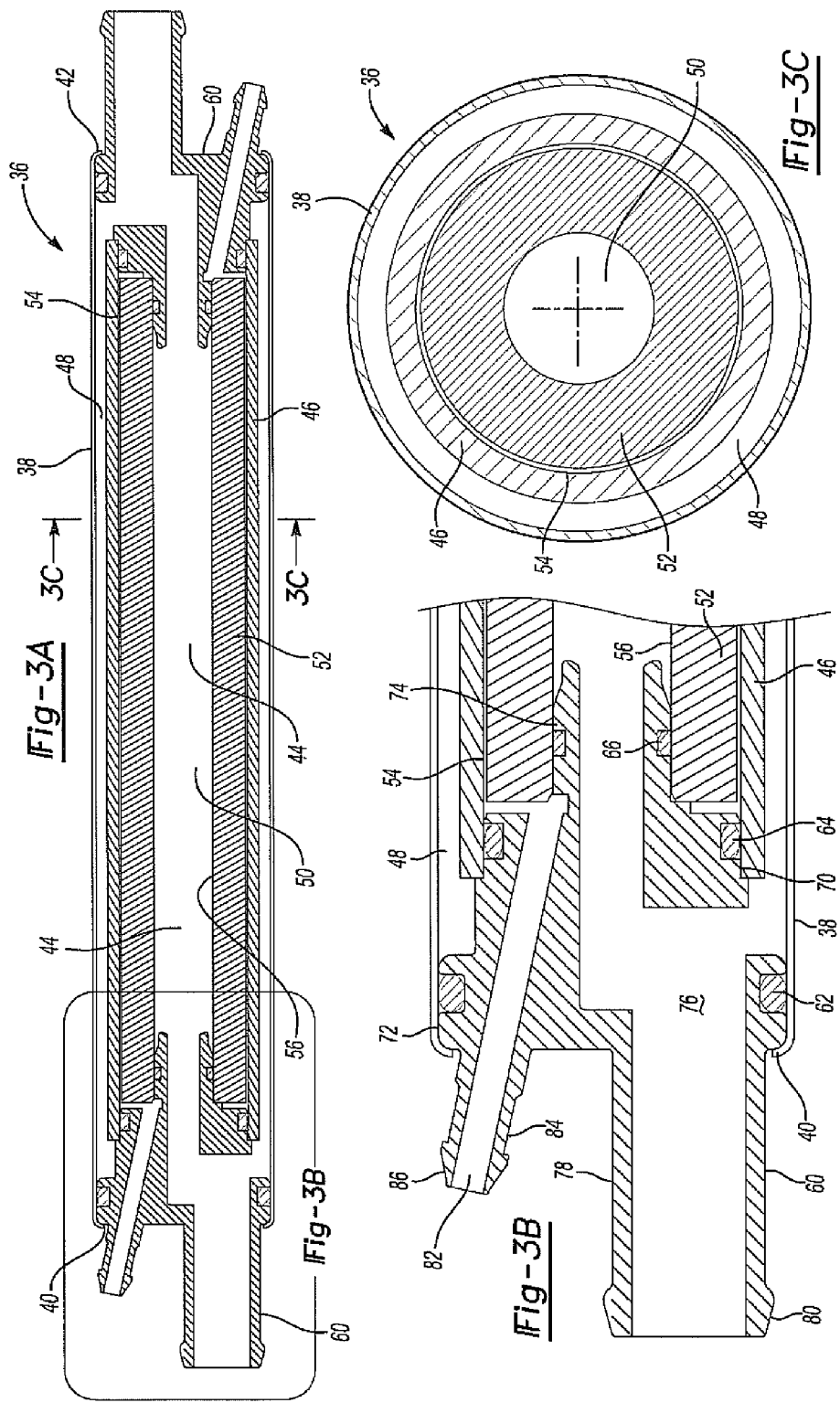

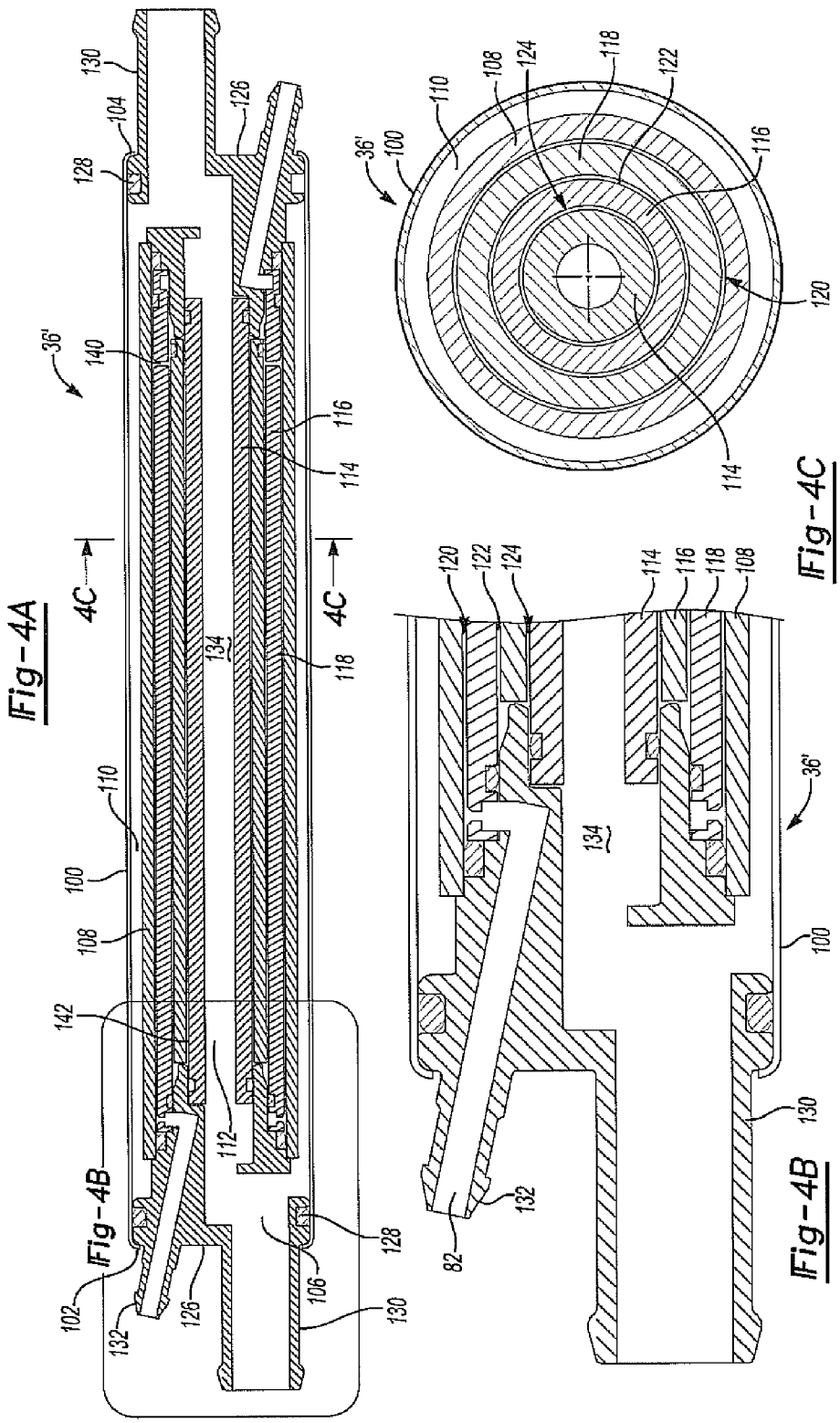

WINDSHIELD WASHER FLUID HEATER

CROSS REFERENCE TO RELATED APPLICATIONS

This application is a continuation-in-part of U.S. patent application Ser. No. 12/541,207 filed Aug. 14, 2009, which claims priority of U.S. Provisional Patent Application Ser. No. 61/089,577 filed Aug. 18, 2008. The contents of both applications are incorporated herein by reference.

BACKGROUND OF THE INVENTION

I. Field of the Invention

The present invention relates generally to vehicle windshield defroster systems.

II. Description of Related Art

The defrosting and deicing of automotive vehicles' front windshields has been typically performed by conventional warm air defrosters. These warm air defrosters are heated by the heat from the coolant system which flows through a defroster core. Air fans then circulate air across the core and up to the inside surface of the windshield.

A primary disadvantage of these previously known warm air windshield defroster systems is that the overall time required to completely defrost and/or deice a front windshield is very lengthy. This relatively long time required to completely defrost and deice the front windshield results from two factors. First, the engine coolant for the internal combustion engine in the automotive vehicle must become sufficiently heated to heat the air used to defrost the front windshield. Depending upon the weather conditions, it may require a minute or two for the engine coolant to become sufficiently heated to heat the air used to defrost the front windshield.

The second, and more important, factor impacting upon the time required to defrost the front windshield using a hot air defrost system is that the heat transfer between the air and the front windshield, as well as the heat conductance through the windshield and to the ice on the front windshield, is very inefficient. Indeed, in very cold conditions and with substantial ice buildup on the front windshield, the actual defrost/ deice operation on the front windshield may require 15-30 minutes. Such a long time delay to defrost/deice the front windshield not only wastes time, but also engine fuel.

In order to provide quicker defrosting/deicing of the front windshield, there have been previously known systems which heat the washer fluid for the front windshield. Many of these previously known heated washer fluid systems have utilized an electric heater fluidly connected to the windshield washer system in order to heat the windshield washer fluid. However, these previously known electrically heated windshield washer systems suffer from a number of disadvantages.

First, both the construction and installation of the electrically heated washer fluid systems are relatively high thus adding a significant cost to the overall vehicle. The automotive industry is particularly competitive so that the addition of a relatively expensive heater system for the washer fluid is economically infeasible.

A second and more significant disadvantage of these previously known electrically heated windshield washer systems is that such systems have been known to malfunction in operation. Indeed, malfunction of the heater system can result in engine compartment fires and resulting damage to the automotive vehicle.

The present invention provides a windshield washer fluid heater which overcomes the above mentioned disadvantages of the previously known systems.

SUMMARY OF THE PRESENT INVENTION

The present invention provides a windshield washer fluid heater for use with a vehicle having a washer fluid system with a source of washer fluid and an engine coolant system which cools the engine by a flow of liquid engine coolant. The heater includes a housing having two open ends and defining a housing chamber. A tubular subhousing is disposed within the housing chamber which separates or divides the housing chamber into an outer housing chamber and an inner housing chamber. A core is then disposed within the inner housing chamber thus forming an annular chamber between the core and the subhousing.

Two end caps are attached to the opposite ends of the housing. Each end cap fluidly sealingly engages the housing and the subhousing to thereby fluidly separate the outer housing chamber from the annular chamber. Preferably, the end caps are of a one piece construction and each end cap is substantially identical to the other.

A washer fluid passageway is formed through each end cap which fluidly connects a washer fluid port on the end cap with the annular chamber. Similarly, a coolant fluid passageway is formed through each end cap and fluidly connects a coolant port on each end cap with the outer housing chamber. The coolant fluid passageway is also connected to a throughbore formed through the core.

In operation, the coolant port on each end cap is fluidly connected to the engine coolant system so that the engine coolant flows both around the annular chamber and through the core. Simultaneously, washer fluid flows through the annular chamber in between the core and the subhousing. Consequently, heat from the engine coolant heats the washer fluid as it flows through the annular chamber so that heated washer fluid is sprayed on the front windshield thus deicing and defrosting the front windshield of the vehicle. Since the heat transfer between the heated washer fluid and the ice buildup on the windshield is much more efficient than a hot air system used on the interior of the front windshield, deicing and defogging of the front windshield may be rapidly performed even under severe ice buildup conditions on the windshield.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is an elevational view illustrating a preferred embodiment of the present invention;

FIG. 3A is a longitudinal sectional view illustrating one embodiment of the washer fluid heater;

FIG. 3B is a blowup of circle 3B in FIG. 3A;

FIG. 3C is a sectional view taken substantially along line 3C-3C in FIG. 3A and enlarged for clarity;

FIG. 4A is a view similar to FIG. 3A but illustrating a modification thereof;

FIG. 4B is a view similar to FIG. 3B but illustrating a modification thereof; and FIG. 4C is a view similar to FIG. 3C but illustrating a modification thereof.

DETAILED DESCRIPTION OF PREFERRED EMBODIMENTS OF THE PRESENT INVENTION

Figure 1:
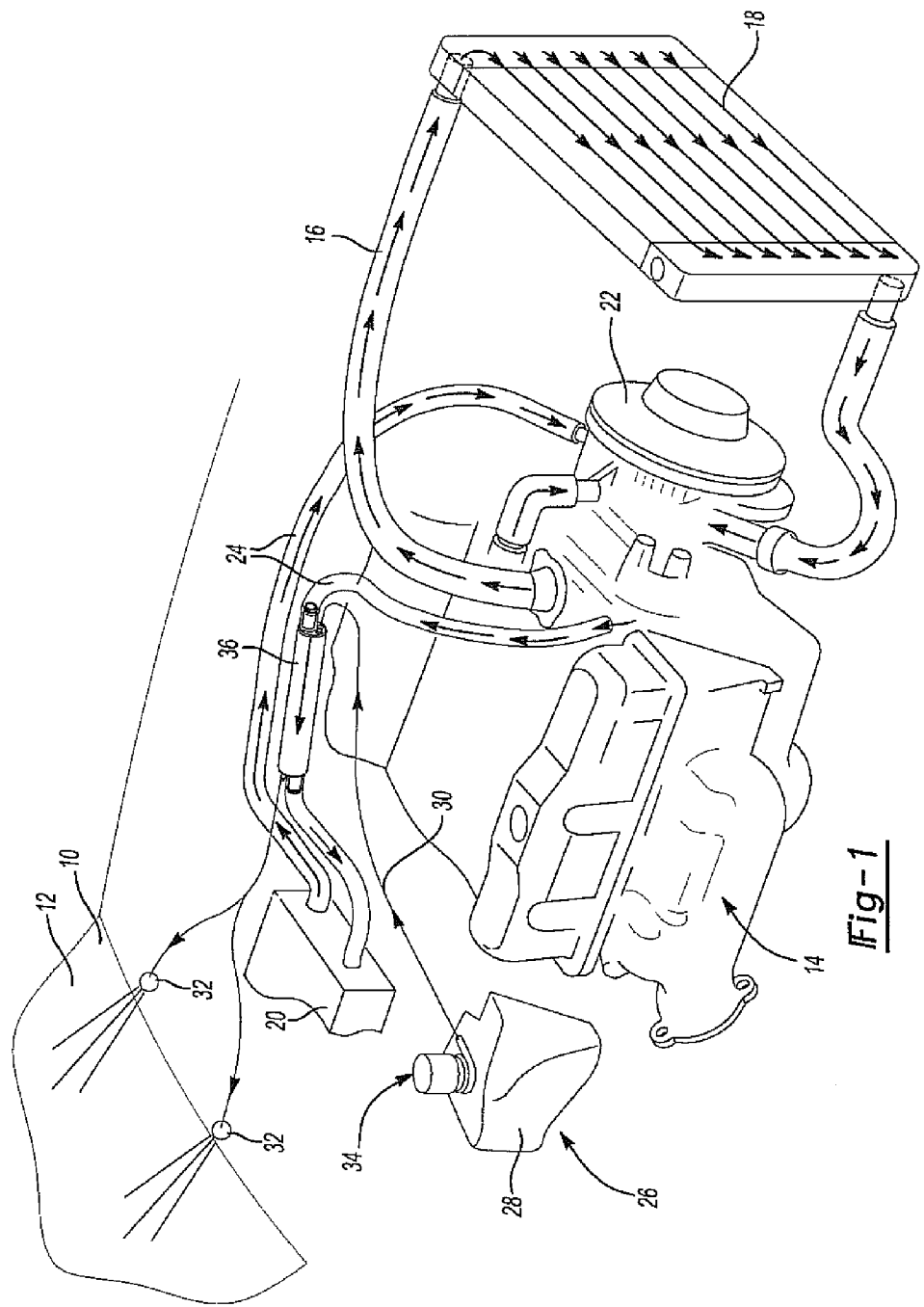
FIG. 1 is a diagrammatic view illustrating the engine, coolant systems, and windshield washer systems of an automotive vehicle.

With reference first to FIG. 1, an automotive vehicle 10 (illustrated only diagrammatically) having a front windshield 12 is shown. The vehicle 10 is powered in part by an internal combustion engine 14 which may be of any conventional construction.

The engine 14, furthermore, includes an engine coolant system 16. In the conventional fashion, the engine coolant system 16 includes internal cooling passages (not shown) within the engine 14. A radiator 18 cools the liquid coolant contained within the coolant system by airflow through or across the radiator 18. The radiator 18 is fluidly connected to the fluid passageways in the engine 14 by conventional radiator hoses.

The coolant system 16 further includes a heater core 20 through which the engine coolant is pumped by a coolant pump 22. In the conventional fashion, the heater core 20 is fluidly connected to the engine coolant passageways by heater hoses 24 so that the heat from the core 20 may be used to heat the interior of the vehicle 10.

The vehicle 10 also includes a windshield washer system 26 having a source 28 of windshield washer fluid. The source 28 of washer fluid is fluidly connected by washer lines 30 to nozzles 32 which are arranged to project the washer fluid onto the windshield 12. These nozzles 32 may be fixed on the vehicle itself, contained within the windshield wipers (not shown) of the vehicle, or in any other convenient location.

A fluid pump 34 is fluidly connected in series with the washer fluid supply line 30 so that, upon activation of the pump 34 by the vehicle operator, the pump 34 pumps the washer fluid from the washer fluid source 28 and to the nozzles 32.

A washer fluid heater 36, which will subsequently be described in greater detail, is fluidly connected in series with the washer fluid supply line 30. Consequently, at least a portion, and preferably all, of the washer fluid pumped from the washer fluid supply 28 and to the nozzles 32 flows through the heater 36.

With reference now to FIGS. 2 and 3A-3C, the heater 36 is there shown in greater detail and includes an elongated tubular and cylindrical housing 38 open at each end 40 and 42 and which defines an elongated cylindrical housing chamber 44. The housing 38 may be constructed of any suitable material such as metal or plastic.

An elongated tubular and cylindrical subhousing 46 is disposed, preferably concentrically, within the housing 38 and separates or divides the housing chamber 44 into an annular cylindrical outer housing chamber 48 and an elongated cylindrical inner housing chamber 50 which is bounded by the inside surface of the subhousing 46.

An elongated tubular and cylindrical core 52 is then disposed, preferably concentrically, within the subhousing 46. The core 52 thus forms an annular cylindrical chamber 54 (FIG. 3B) in between the outer surface of the core 52 and the inner surface of the subhousing 46. The core 52 also includes an axially extending throughbore 56.

Both the core 52 as well as the subhousing 46 are constructed of a material having high thermal conductivity, such as metal. Furthermore, as best shown in FIG. 3C, the outer diameter of the core 52 is only slightly less than the inner diameter of the subhousing 46 so that the thickness of the annular chamber 54 formed between the core 52 and subhousing 46 is very small relative to the overall diameter of the heater housing 38. Preferably, the core 52 and subhousing 46 are dimensioned so that the ratio of the wetting surface of the annular chamber 54 to the volume of the annular chamber 54 is greater than 700 meters$^2$/meters$^3$.

Referring now particularly to FIGS. 3A and 3B, an end cap 60 is attached to and closes each end 40 and 42 of the housing 38. Each end cap 60 is preferably identical to the other end cap 60 and the end caps 60 are preferably constructed by molded plastic or similar material. Furthermore, since the end caps 60 are essentially identical to each other, only a single end cap 60 will be described in detail, it being understood that a like description shall apply to the other end cap 60.

As best shown in FIG. 3B, a fluid seal 62, such as an O-ring, is carried by the end cap 60. This seal 62 sealingly engages the inner diameter of the housing 38 to fluidly seal the housing chamber 44. A subhousing fluid seal 64, such as an O-ring, is also carried by the end cap 60 and fluidly seals an inner diameter of the subhousing 46. Similarly, a core fluid seal 66 carried by the end cap 60 engages and fluidly seals an inside surface of the core 52. The seals 64 and 66 together thus fluidly seal the annular chamber 54 from both the outer housing chamber 48 as well as the throughbore 56 in the core 52. The end caps 60, together with their associated fluid seals 62, 64 and 66, not only fluidly isolate the annular chamber 54 from the core throughbore 56 and outer housing chamber 48, but also serve to locate the core 52, subhousing 46, and housing 38 relative to each other. In particular, a pair of locating surfaces 70 and 72 on the end cap 60 locate the housing 38 and subhousing 46 relative to each other and preferably so that they are concentric with each other. Similarly, a further locating surface 74 on the end cap 60 engages the inside diameter of the core throughbore 56 and, together with the locating surface 70, locates the core 52 relative to the subhousing 46.

Still referring to FIGS. 3A and 3B, a coolant fluid passageway 76 in the end cap 70 fluidly connects a coolant port 78 having a hose nipple 80 to both the outer housing chamber 48 and core throughbore 56. Consequently, with the coolant fluid ports 78 fluidly connected to the engine coolant system, fluid flows through both the outer housing chamber 48 as well as the core throughbore 56 during the operation of the vehicle.

A washer fluid passageway 82 is also formed in the end cap 60. This washer fluid passageway 82 fluidly connects the washer fluid port 84 preferably having a hose nipple 86 to the annular passageway 54 formed between the core 54 and subhousing 44. Consequently, upon activation of the washer fluid pump 34, washer fluid flows through the passageway 82, annular chamber 54, and out through the washer fluid passageway 82 on the other end cap 60.

In operation, the coolant ports 78 on the end caps 60 are connected in series with the coolant system for the vehicle. Although any hose connection may be utilized, a fluid connection of the coolant ports 70 in series with one of the hoses to the heater core 20 (FIG. 1) may be used. Regardless of exactly how the coolant ports 78 are connected to the coolant system for the engine, the flow of coolant through the outer housing chamber 48 and core throughbore 56 heats both the subhousing 46 as well as the core 52.

Upon activation of the washer fluid pump 34 (FIG. 1), the pump 34 pumps the washer fluid into and through the annular chamber 54. However, since the annular chamber 54 has such a small radius relative to the overall heater, the washer fluid becomes rapidly heated as it flows through the annular chamber 54 by heat conducted from both the core 52 as well as the subhousing 46. The washer fluid flow out through the washer fluid port 84 in the other end cap 60 is thus heated and performs rapid deicing and defrosting on the windshield.

Upon deactivation of the washer fluid pump 34, the washer fluid contained within the annular chamber 54 will, in almost all cases, "boil off". However, since the volume of the annular chamber 54 is very small, the amount of washer fluid lost during a boil off is insignificant.

With reference now to FIGS. 4A-4C, a modification of the water heater 36' is illustrated. The water heater 36' includes an elongated tubular and cylindrical housing 100 open at each end 102 and 104 and which defines a cylindrical housing chamber 106. The housing 100 may be constructed of any suitable rigid material, such as metal or plastic.

An elongated tubular and cylindrical subhousing 108 is disposed, preferably concentrically, within the housing 100. In doing so, the subhousing 108 separates or divides the housing chamber 106 into an annular cylindrical outer housing chamber 110 formed between the housing 100 and subhousing 108, and an inner housing chamber 112 within the interior of the subhousing 108.

Three concentric tubular and cylindrical cores 114, 116 and 118 are concentrically disposed within the subhousing 108. Furthermore, as best shown in FIG. 4B, these cores 114, 116 and 118 are radially spaced apart from each other thus forming an outer annular chamber 120 between the core 118 and subhousing 108, a middle annular chamber 122 between the cores 116 and 118, and an inner annular chamber 124 between the innermost core 114 and the middle core 116.

As best shown in FIGS. 4A and 4B, an end cap 126 is attached to each end 102 and 104 of the housing 100 and fluidly sealed to the housing 100 by O-rings 128. Each end cap 126, furthermore, includes both a fluid port 130 for the engine coolant as well as a fluid port 132 for the windshield wiper fluid.

The engine coolant port 130 on one cap 126 is fluidly connected to the engine coolant port 130 at the other end 104 of the housing 100 by a fluid passage 134 formed axially through the innermost core 114. The engine coolant fluid port 130, furthermore, is also fluidly connected to the outer housing chamber 110 so that, in operation, engine coolant flows both through the innermost core 114 as well as around the subhousing 108.

The windshield washer fluid supply line is connected in series with the nipples 132 at the opposite ends of the housing 100. At one end 102, the nipple 132 is fluidly connected to the outermost annular chamber 120 formed between the subhousing 108 and the outermost core 118. One or more radial passageways 140 (see FIG. 4A) fluidly connect the outermost annular chamber 120 with the middle annular chamber 122 adjacent the opposite end of the outer core 118. Similarly, radial passageways through the middle core 116 adjacent the first end 102 of the housing fluidly connect the middle annular chamber 122 with the innermost annular chamber 124. The innermost annular chamber 124, in turn, is fluidly connected to the windshield washer fluid nipple 132 at the end 104 of the housing 100.

Consequently, in operation, upon activation of the windshield washer fluid pump, the washer fluid flows into the nipple 132 at the first end 102 of the housing 100 and flows axially through the outermost annular chamber 120. The washer fluid then flows through the middle annular chamber 122 in the opposite axial direction back to a position adjacent the first end of the housing 100 and then flows into the innermost annular chamber 124 and flows axially toward the second end 104 of the housing and out through the nipple 132 on the cap 126 at the second end 104 of the housing.

The provision of the three concentric cores in the FIGS. 4A-4C embodiment of the invention provides for increased heat storage by the cores. This, in turn, provides increased and rapid heat transfer from the three cores to the windshield washer fluid for enhanced performance.

The end cap 126 also contains location surfaces in order to locate and maintain the separation between the subhousing 108 and cores 114, 116 and 118.

From the foregoing, it can be seen that the present invention provides a simple yet effective heater for a washer fluid system in an automotive vehicle or the like. Having described our invention, however, many modifications thereto will become apparent to those skilled in the art to which it pertains without deviation from the spirit of the invention as defined by the scope of the appended claims.

We claim:

1. In combination with an automotive vehicle having an engine coolant system and a fluid windshield wiper cleaning system, a windshield washer fluid heater comprising:
    a housing having two open ends and defining a housing chamber,
    a tubular subhousing disposed in said housing chamber which separates said housing chamber into an outer housing chamber and an inner housing chamber,
    a core disposed in said inner housing chamber and forming an annular chamber between said core and said subhousing,
    a pair of end caps, one end cap attached to each end of said housing, said end caps fluidly sealingly engaging said housing and said subhousing to thereby fluidly separate said outer housing chamber from said annular chamber,
    a washer fluid passageway formed through each end cap which fluidly connects a washer fluid port on said end cap with said annular chamber, and
    a coolant fluid passageway formed through each end cap which fluidly connects a coolant port on each said end cap with said outer housing chamber,
    said coolant ports are connected with the engine coolant system and said washer fluid ports are connected with the washer fluid system,
    wherein the ratio of wetted surface area of the annular chamber to the volume of the annular chamber exceeds 700 meters$^2$/meters$^3$.

2. The heater as defined in claim 1 wherein said core is constructed of a material with high thermal conductivity.

3. The heater as defined in claim 2 wherein said core is constructed of metal.

4. The heater as defined in claim 1 wherein said core includes a through passageway having two ends, one end of said core through passageway being connected to said coolant passageway in one end cap and the other end of said core through passageway being connected to the coolant passageway in the other end cap.

5. The heater as defined in claim 1 wherein both said housing and said subhousing are tubular and cylindrical in shape.

6. The heater as defined in claim 5 wherein both said housing and said subhousing are constructed of metal.

7. The heater as defined in claim 1 wherein each end cap is substantially identical to the other end cap.

8. The heater as defined in claim 1 wherein said housing is elongated between its ends.

9. The heater as defined in claim 1 and comprising a fluid seal between each end cap and said housing.

10. The heater as defined in 9 and comprising a fluid seal between each end cap and said subhousing.

11. The heater as defined in claim 4 and comprising a fluid seal between each end cap and said core.

12. The heater as defined in claim 11 wherein each said fluid seal sealingly engages a wall of said through passageway.

13. The heater as defined in claim 1 wherein each coolant port comprises a fluid nipple.

14. The heater as defined in claim 1 wherein each washer fluid port comprises a fluid nipple.

15. The heater as defined in claim 1 and comprising at least two cores concentrically disposed in said housing and radially spaced apart from each other thereby forming a second annular chamber therebetween, said second annular chamber being fluidly connected to said first mentioned annular chamber.

* * * * *